United States Patent [19]
Morano

[11] Patent Number: 5,529,801
[45] Date of Patent: *Jun. 25, 1996

[54] THERMOSTABLE EDIBLE COMPOSITION HAVING ULTRA-LOW WATER ACTIVITY

[75] Inventor: James R. Morano, Somerset, N.J.

[73] Assignee: Crompton & Knowles Corporation, Stamford, Conn.

[*] Notice: The term of this patent shall not extend beyond the expiration date of Pat. No. 5,366,750.

[21] Appl. No.: 345,694

[22] Filed: Nov. 21, 1994

Related U.S. Application Data

[63] Continuation of Ser. No. 4,051, Jan. 13, 1993, Pat. No. 5,366,750.

[51] Int. Cl.$^6$ .................................... A23L 1/0534
[52] U.S. Cl. ........................ 426/572; 426/94; 426/573; 426/659
[58] Field of Search ................ 426/572, 94, 573, 426/659

[56] References Cited

U.S. PATENT DOCUMENTS

| | | | |
|---|---|---|---|
| 3,202,514 | 8/1965 | Burgess et al. | 426/532 |
| 4,004,039 | 1/1977 | Shoaf et al. | 426/583 |
| 4,037,000 | 7/1977 | Burge et al. | 426/572 |
| 4,146,652 | 3/1979 | Kahn et al. | 426/564 |
| 4,154,863 | 5/1979 | Kahn et al. | 426/553 |
| 4,234,611 | 11/1980 | Kahn et al. | 426/321 |
| 4,374,702 | 2/1983 | Turbak et al. | 162/100 |
| 4,451,488 | 5/1984 | Cook et al. | 426/89 |
| 4,481,076 | 11/1984 | Herrick | 162/158 |
| 4,605,561 | 8/1986 | Lang | 426/93 |
| 4,670,272 | 6/1987 | Chen et al. | 426/572 |
| 4,707,374 | 11/1987 | King et al. | 426/572 |
| 4,752,494 | 6/1988 | Tang et al. | 426/573 |
| 4,774,095 | 9/1988 | Kleinschmidt et al. | 426/94 |
| 4,853,243 | 8/1989 | Kahn et al. | 426/564 |
| 4,861,604 | 8/1989 | Tang et al. | 426/94 |
| 4,911,946 | 3/1990 | Singer et al. | 426/658 |
| 4,923,981 | 5/1990 | Weibel et al. | 426/605 |
| 4,952,414 | 8/1990 | Kaufman et al. | 426/93 |
| 5,011,701 | 4/1991 | Baer et al. | 426/573 |
| 5,079,012 | 1/1992 | Lengerich et al. | 426/547 |
| 5,366,750 | 11/1994 | Morano | 426/572 |

*Primary Examiner*—Esther M. Kepplinger
*Assistant Examiner*—Milton I. Cano
*Attorney, Agent, or Firm*—Bernard F. Crowe; Paul Grandinetti

[57] ABSTRACT

The invention is a composite food subsystem that provides a sweet or savory-flavored thermostable filling having an ultra-low water activity. The thermostable filling is, also, thixotropic or "shear thinning". The filling includes an edible hydrophilic liquid phase. A stabilizing network of ultrahigh surface area cellulose particulates are dispersed and reactivated in the hydrophilic liquid phase. A solid phase admixture can be added as a fine powder. The thermostable filling is desirable for use in methods for making co-extruded or co-laminated products of multi-textures.

12 Claims, No Drawings

5,529,801

THERMOSTABLE EDIBLE COMPOSITION HAVING ULTRA-LOW WATER ACTIVITY

This application is a continuation application of U.S. application Ser. No. 08/004,051 filed on Jan. 13, 1993, now U.S. Pat. No. 5,366,750.

BACKGROUND OF THE INVENTION

1. Field of the Invention

The invention relates to a thermostable edible composition having an ultra-low water activity. Specifically, the invention relates to a thermostable edible composition having an ultra-low water activity and containing an ultrahigh surface area particulate.

2. Description of the Related Art

The control of water activity in a food product can enable the food product to resist spoilage and maintain a fresh taste and mouth feel. The water activity of a food, or a food subsystem thereof, is a useful measurement of the degree of "freeness" of water contained in that food. Water activity is determined by the combined effect of the moisture content of the food as well as the nature of various components dissolved in an aqueous phase of the food.

The water activity ($A_w$) of a food is defined as the partial vapor pressure of water in the food divided by the saturation vapor pressure of pure water at the temperature of the food. The water activity of a food can be measured by placing a sample of the food to be tested in a container. The container is then sealed and the relative humidity above the sample is determined after equilibrium is reached.

The relatively high water activities, that are associated with fillings and cremes made by standard formulations, permit microbial growth, moisture migration, and other problems to occur in a food product. Fillings and cremes with high water activities are, essentially, a medium for supporting microbial growth and, therefore, have limited shelf lives. Fillings and cremes with high water activities, generally, allow water to migrate into the surrounding foodstuff. When the surrounding foodstuff is a material of significantly lower water activity, such as a baked dough, the migration of moisture into the baked dough makes the baked dough "soggy." Low water activities are, usually, required in baked doughs in order to maintain a crisp and crunchy texture.

The incorporation of thermostable properties into fillings and other "food subsystems" often requires the use of stabilizers as flow control agents. Gums and other hydrocolloids are common stabilizers for aqueous food systems. Stabilizers provide flow control properties to aqueous food systems by altering the viscosity and texture of a food matrix. Stabilizers, such as gums or hydrocolloids, generally, must be "activated" in the water or moisture content of such food systems in order to be effective. Many gums, even when activated, do not provide suitable thermostability to an aqueous food system because the stabilization properties of the gum are affected and altered by temperature. Fillings, that are stabilized by gums, often flow at temperatures that are commonly used during food preparation such as baking.

Two types of gums or hydrocolloids are particularly effective in the preparation of thermostable fillings. A first group of gums form thermally irreversible gels. Thermally irreversible gels are useful in the preparation of "ovenable fillings" and are commonly prepared from high methoxy pectins. Thermally irreversible gels do not melt or flow unless they are exposed to temperatures that are significantly higher than the temperatures required for their original activation. A second group of gums alter the viscosity characteristics of an aqueous food system to render the aqueous food system essentially insensitive to temperature. An example of a viscosity altering gum is xanthan. Xanthan is a microbially-derived gum and provides viscosity properties to an aqueous food system. The viscosity properties are affected by stress or shear thinning rather than temperature. Viscosity altering gums provide an aqueous food system, such as fillings, that do not flow unless the temperature reaches the boiling point or the internal shear point of the aqueous food system.

Gums and other hydrocolloids, such as high methoxy pectin and xanthan, must remain activated within the water of an aqueous food system such as a filling. Typically, an aqueous food system must contain at least 20 percent moisture for these gums and hydrocolloids to remain activated. A gum or hydrocolloid is "activated" when it is in solution and functional. Therefore, gums and hydrocolloids are ineffectual as stabilizing agents in food systems that have moisture contents below about 15 percent.

U.S. Pat. No. 4,037,000 to Burge et al. discloses an icing mixture. The icing mixtures of Examples 3 and 4 of the patent are compositions containing glycerol and aqueous xanthan. These compositions include glucose syrup and can contain from 6.0 to 10.5 percent by weight of free water. This patent does not disclose a thermostable creme having an ultra-low water activity.

U.S. Pat. No. 4,670,272 to Chen et al. discloses a thermostable creme. The compositions of the creme of this patent can contain small concentrations of "polyols." The compositions of this patent contain high fructose corn syrup or standard corn syrup and can contain cellulose products. The water activity of the creme of this patent is "low" or has an $A_w$ value of 0.6 to 0.7. The compositions of this patent are aerated cremes wherein modified starch is activated by cooking and provides the stabilizing and texturizing properties to the food system. The creme of this patent does not have an ultra-low moisture content, ultra-low water activity, or shelf life of 9 to 12 months.

U.S. Pat. No. 4,752,494 to Tang et al. discloses a thermostable edible creme. The compositions of the creme of this patent can contain cellulose products, such as the Avicel™ product, and maltodextrin. The creme of this patent contains water from syrups or from water added to the creme. The added water can be in a concentration of up to 15 percent. Water must be present in a sufficient concentration to provide an "intermediate water activity base matrix" for calcium ions. The calcium ions and soluble caseinate of the creme of this patent stabilize and texturize the creme by forming a complexing gel between these two ingredients. The creme of this patent does not have an ultra-low moisture content, ultra-low water activity, or a shelf life of 9 to 12 months.

U.S. Pat. No. 4,774,095 to Kleinschmidt et al. discloses filling-containing, dough-based products. This patent discloses an aqueous-based composition, but the composition combines glycerin with cellulose products. The preparation of this patent obtains a thermostable filling which uses defibrillated cellulose as a thixotropic flow control agent to obtain a relatively low viscosity. High-methoxy pectin is further employed, as a gelling hydrocolloid, to reduce the "stringiness" that is caused by the defibrillated cellulose and to establish a thermally irreversible matrix to prevent "boil-out" in the oven. The continuous phase of this filling is an aqueous sugar solution. The sugar solution must be selected so as to avoid crystallization that can result in an undesirable texture and "mouth feel." The fillings of this patent have a water activity value below 0.5. The cellulose products, that are disclosed in this patent, are not "reactivated" in a non-aqueous polyol liquid in order to provide thermostability to the polyol liquid.

U.S. Pat. No. 4,861,604 to Tang et al. describes a sheetable thermostable filling composition. The composition for the sheetable filling is applied in a thin laminate form. The functionality of the disclosed composition is provided by gelatin, maltodextrin, and pregelled starch. An intermediate preparation is critical to obtaining a low moisture content and water activity in the final baked product. The filling of this patent does not provide a multi-purpose thermostable filling having ultra-low water activity.

The industry lacks a thermostable edible composition that has an ultra-low moisture content, an ultra-low water activity, and a shelf life of at least nine months. The industry further lacks a thermostable filling that has these properties and a total lipid content of 15 percent or less.

SUMMARY OF THE INVENTION

The edible composition of the invention includes a non-aqueous hydrophilic liquid and an ultrahigh surface area cellulose in sufficient quantity to heat stabilize the composition.

The invention is, also, a method. The method includes mixing a non-aqueous hydrophilic liquid with a sufficient quantity of ultrahigh surface area cellulose into a slurry. Heating of the slurry is conducted to a temperature sufficient to activate the ultrahigh surface area cellulose. Shearing of the slurry then occurs until the ultrahigh surface area cellulose is reactivated.

The invention includes thermostable fillings, that contain the invented composition, and methods for using the composition in a food.

DESCRIPTION OF THE PREFERRED EMBODIMENTS

The edible composition of the invention includes a non-aqueous hydrophilic liquid and an ultrahigh surface area cellulose in sufficient quantity to heat stabilize the composition. The invented composition is thermostable and has an ultra-low water activity. The thermostable filling of this invention provides a "composite food subsystem" or filling for a foodstuff. The term "composite food subsystem" refers to fillings and also includes cremes, laminates, toppings, and the similar compositions.

Thermostable fillings, according to the invention, can be either sweet or savory and are particularly useful in the production of filled bakery products such as cookies, pretzels, pastries, bread sticks, and crackers. Thermostable fillings, according to this invention, can also be used in other non-dough-based products such as filled confections having creme centers, taffy's, and caramels. The ultra-low water activity of the thermostable filling of this invention is at least below 0.6. The ultra-low water activity of desirable embodiments of the invented filling is below 0.5. The water activity of the preferred embodiment of the filling is between 0.15 and 0.45.

This invention includes methods for using the thermostable filling, having an ultra-low water activity, to prepare ready-to-eat products. These methods involve filling or otherwise combining an uncooked dough or confection food with the thermostable filling and, then, cooking the combined food system. The thermostability of the filling enables the filling to withstand high temperatures of baking, frying, or extruding without losing its texture or exhibiting "boil-out" during the cooking process. Desirable embodiments of the method of this invention provide multi-layered and multi-textured food compositions wherein the outer layers are a bakery dough. These embodiments desirably, but not exclusively, include methods of co-extruding or co-laminating the combined food subsystems. The final ready-to-eat products of these methods have long shelf lives of at least nine months because the low water activity of the filling (1) minimizes microbial problems and (2) maintains a crisp texture in adjacent food subsystems. These results are provided by the invention because the invention substantially reduces or eliminates any moisture, that is available for "moisture migration," between the invented filling and the crumb food subsystem that is adjacent to the filling.

The invented edible composition, that provides the base of the filling, has a feel and consistency of fat and has a very low water activity or $A_w$ value as low as 0.15. Where it is desirable to raise the water activity of the final product, limited amounts of moisture can be added to the continuous liquid phase. A saturated solution of a sweetener, for example, is desirable for this purpose. Furthermore, it is often desirable to add an edible solid phase to the continuous phase of a filling in amounts up to 75 percent based on the weight of the continuous phase. The edible solid phase is most commonly a fine or "fondant quality" powder. The edible solid phase is, desirably, a member selected from the group consisting of flavoring materials, flavoring agents, taste modifiers, colorants, and other "functional ingredients", and mixtures of these. Other functional ingredients include buffer systems. Buffer systems can be added to the filling to impart desirable taste and textural properties.

The ultrahigh surface area cellulose in a thermostable filling provides an effective flow control agent and provides the filling with its thermostable properties. Ultrahigh surface area cellulose can be prepared by a variety of processes from cellulose.

Cellulose comprises primary linear chains of beta 1-4 D-glucopyranose units with an arrangement of secondary chains of beta 1-4 D-glucose to form an aggregate molecule. The primary linear chains within this aggregate molecule can be arrayed in a very ordered manner, such as a parallel or an anti-parallel manner. Alternatively, the primary linear chains can be arrayed in other complex structures including random structures. The secondary structure chains of cellulose are known as "microfibrils" and often, also, form a tertiary structure in the aggregate molecule. Therefore, regions of varying crystalline cellulose structures can be dispersed between or among regions of amorphous cellulose. These different adjacent microfibrils form strong inter-microfibrillular associations and stabilize varying tertiary cellulose structures. Accordingly, cellulose structures such as bundles, sheets, and the like can form a tertiary structure of cellulose. This tertiary structure of cellulose is commonly known as a fibril or a fiber.

The application of high shear to cellulose causes defibrillation of the cellulose. The defibrillation of the cellulose results in the distention and dislocation of microfibrils from the surface of the tertiary structures. This distention and dislocation of microfibrils expands or creates a hairy assemblage of microfibrils. It is believed that these exposed microfibrils cause the fibrils to adhere together and to form a network. Possibly, the microfibrillular surface area of the network simultaneously exposes an extensive amount of hydroxyl groups. The hydroxyl groups can provide a high degree of inter-particle association and a substantial amount of hydrogen bonding between the fibrils and microfibrils throughout a hydrophilic continuous phase of a filling.

The edible composition of this invention is made by reactivating an "ultrahigh surface area cellulose" or "USAC" in a non-aqueous hydrophilic liquid. An ultrahigh surface area cellulose is provided by first processing a selected cellulose to "activate" or expand its surface area. This first activation, typically, occurs in water and develops a sufficient particulate surface area in the cellulose to permit the cellulose to function as a stabilizer. The selection of a cellulose for use as the ultrahigh surface area cellulose can be performed by a viscosity test procedure.

The viscosity test procedure for selecting an ultrahigh surface area cellulose is performed on a cellulose-gel of the sample of cellulose. The cellulose-gel can be prepared from a slurry or a powder of the sample of cellulose as follows.

TABLE 1

CELLULOSE-GEL SAMPLE PREPARATION
FROM A CELLULOSE SLURRY

1. Use a two percent homogenate of the selected slurry of cellulose-gel.

2. Weigh 250 grams of the slurry of cellulose-gel and 750 grams of tap water in separate beakers.

3. Transfer the slurry of cellulose-gel and the tap water into a Waring blender. Use some of the tap water to rinse out the beaker for the slurry of cellulose-gel.

4. Blend the slurry of cellulose-gel and tap water on high speed for 15 seconds.

TABLE 2

CELLULOSE-GEL SAMPLE PREPARATION
FROM A CELLULOSE POWDER

1. Use a spray dried activated cellulose-gel at a 33.3 percent load level.

2. Place 220 grams of very hot tap water and 5 grams of cellulose powder into a Warning blender. The temperature of the tap water should be hot enough to be uncomfortable to the touch. The cellulose powder can be placed on top of the hot tap water.

3. Blend the hot tap water and cellulose power for four minutes.

4. Transfer the blended tap water and cellulose powder to a two liter beaker.

5. Rinse the beaker of the Waring blender with 100 grams of hot tap water by blending the hot tap water in the beaker on high speed for 15 seconds.

6. Transfer the blended rinse water from the beaker of the Waring blender to the two liter beaker.

7. Repeat steps two through six twice using 125 grams of hot tap water to rinse the beaker of the Waring blender so as to bring the total weight of the sample in the two liter beaker to 1000 grams.

It is understood that, if the concentration of the homogenate of the slurry of cellulose-gel in Table 1 or if the percent load level of spray dried activated cellulose-gel in Table 2 are different than the concentration or load level stated in these tables, the selected sample of cellulose slurry or cellulose powder is to be adjusted so as to provide a cellulose-gel sample for use in the viscosity test procedure.

The viscosity test procedure uses a sample of cellulose-gel that is prepared by either the procedure of Table 1 or of Table 2 as described above. The viscosity test procedure is as follows.

TABLE 3

CELLULOSE-GEL VISCOSITY TEST
PROCEDURE

1. Prepare a 0.5 percent by weight sample of the cellulose-gel.

2. Pour 500 milliliters of the 0.5 percent by weight sample of the cellulose-gel into a beaker.

3. Equip a Brookfield viscosimeter with a #3 Spindle and set the viscosimeter at 10 revolutions per minute.

4. Lower the spindle into the cellulose-gel sample to the mark on the stem of the spindle.

5. Turn on the viscosimeter and allow the viscosimeter to make four revolutions. Read the viscosimeter on the fifth revolution.

6. Raise the spindle out of the sample, disconnect the spindle, and shake the sample vigorously to remove any free cellulose-gel. Reconnect the spindle to the viscosimeter and stir the cellulose-gel in the beaker with a spatula.

7. Repeat steps four through six.

8. Make and record four separate readings on the same cellulose-gel sample and calculate their average value as the viscosity of the cellulose-gel sample.

The average value of the viscosity of the selected cellulose-gel sample is used to evaluate the suitability of the cellulose as an ultrahigh surface area cellulose.

The average value of the viscosity of the selected ultrahigh surface area cellulose must be sufficient to heat stabilize a selected edible non-aqueous hydrophilic liquid in order for the cellulose to function as an ultrahigh surface area cellulose. The average value of the viscosity of the ultrahigh surface area cellulose is at least about 250 centipoise. The preferred viscosity of the selected ultrahigh surface area cellulose is about 1100 centipoise. A desirable ultrahigh surface area cellulose has a viscosity between about 250 centipoise and about 1950 centipoise.

The edible composition of this invention has a concentration of ultrahigh surface area cellulose that is sufficient to provide a surface area of a fibril and microfibril network to thermostabilize an edible non-aqueous hydrophilic liquid phase. The surface area of the fibril and microfibril network is, desirably, at least 100 square meters per gram ($m^2$/gm). More desirably, the total surface area of the ultrahigh surface area cellulose, when reactivated in an edible non-aqueous hydrophilic liquid, is in range from about 100 to about 200 $m^2$/gm. This relatively large surface area is important to the flow control properties of the edible composition or a filling made from the edible composition. The surface area of a selected ultrahigh surface area cellulose can be measured using a Quantasorb instrument. This instrument is manufactured by the Quantachrome company, Syosset, New York. This instrument performs a monolayer nitrogen adsorption analysis of a prepared, dried sample of the ultrahigh surface area cellulose. This analysis is explained in the manual by Dawes, *Biological Techniques for Transmission & Scanning Electron Microscopy,* 2nd ed. (1979), 231–239.

The desired surface areas of ultrahigh surface area cellulose are, typically, provided in concentrations of about 0.20 percent to about 4.0 percent by weight of an ultrahigh surface area cellulose in the composition. The concentration of a selected ultrahigh surface area cellulose, that is sufficient to heat stabilize an edible non-aqueous hydrophilic liquid, is affected by the "functionality" of the ultrahigh surface area cellulose. The functionality of an ultrahigh surface area cellulose is determined by its surface area. An estimation as to whether the surface area of a cellulose sample is sufficient to function in this invention is provided by the average viscosity of the cellulose sample as explained above. Therefore, as the surface area of a cellulose increases, the concentration of the ultrahigh surface area cellulose, that is required to provide thermostability to an edible non-aqueous hydrophilic liquid, decreases.

A sufficient network of fibrils and microfibrils of ultrahigh surface area cellulose causes the invented filling to be thixotropic. The ultrahigh surface area cellulose, in the absence of mechanical shear, forms a cohesive mesh with the filling. This structural entanglement or mesh imparts a very high resting viscosity to the filling. This high resting viscosity is not significantly reduced until the temperature of the filling is elevated to the boiling point of the filling. As a result, this network resists or prevents flow of the filling during heating operations such as baking, frying, or extruding.

Moderate mechanical shear, in contrast, disrupts this cohesive mesh of the filling of the invention and lowers the viscosity of the filling. For example, the shear forces generated during mastication are sufficient to disrupt this network. Mastication of the filling lowers the viscosity of the filling and disperses it rapidly in the mouth. This rapid, fluid dispersion provides a flavor release from the filling and creates an organoleptic sensation of moistness.

The thixotropic cohesive network of ultrahigh surface area cellulose is composed, essentially, of water insoluble colloidal size particles of fibrils and microfibrils. This assemblage of fibrils and microfibrils functions as a water insoluble hydrocolloid stabilizer. In contrast, all other gums and hydrocolloids are, essentially, water soluble and require dissolution in water for activation of their stabilization properties. The independence of ultrahigh surface area cellulose from water for its activation properties provides thermostability to a filling having a very low moisture content. This property is identified as "reactivation" and is performed in the edible non-aqueous hydrophilic liquid.

The continuous liquid phase of the invented filling, desirably, includes other hydrophilic liquids which can facilitate hydrogen bonding within the invented composition of non-aqueous hydrophilic liquid and ultrahigh surface area cellulose. The presence of another hydrophilic liquid in the invented filling facilitates thermostability of the filling and permits the filling to remain, essentially, water-free.

Ultrahigh surface area cellulose can be prepared by a number of processes. A specific source of an ultrahigh surface area cellulose, that is suitable for use with this invention, is derived from a cellulose product that is a member selected from the group consisting of microfibrillated cellulose, microreticulated microcrystalline cellulose, parenchymal cell cellulose, bacterial cellulose, and mixtures of these. Other sources of ultrahigh surface area cellulose can also be used for this invention.

Microfibrillated cellulose ("MFC") is produced from a low solids liquid suspension of regular cellulose pulp. A slurry of pulp is heated to a temperature of, desirably, at least 80° C. and passed through a commercially available APV Gaulin homogenizer that applies pressures of, preferably, between 5,000 to 8,000 pounds per square inch (psi). As the cellulose suspension passes through a small diameter orifice of the homogenizer valve assembly, the suspension is subjected to a high viscosity shearing action followed by a high viscosity decelerating impact against a solid surface. The high viscosity shearing action and decelerating impact are both caused by an instantaneous drop in pressure or "explosive decompression". This process is repeated until the slurry of pulp becomes a substantially stable suspension. The stable suspension results from the development of an ultrahigh surface area. This process converts cellulose into microfibrillated cellulose without substantial chemical change to the cellulose starting material.

Microreticulated microcrystalline cellulose ("MRMCC") is produced from a low solids aqueous suspension of microcrystalline cellulose. Microreticulated microcrystalline cellulose is commercially available from the FMC Corporation under the trade name "Avacel PH101". The aqueous suspension of microcrystalline cellulose is passed through a commercially available APV Rannie homogenizer. The homogenizer applies super pressures of at least 12,000 psi and, preferably, at least 13,500 psi. The aqueous microcrystalline cellulose dispersion is subjected to the same high shear zone conditions as described above for the explosive decompression. This homogenization process is repeated until an aqueous dispersion of porous microreticulated microcrystalline cellulose particles, having the required ultrahigh surface area, is generated.

Parenchymal cell-containing products, such as spent sugar, beet pulp, and citrus juice sacs, are materials used for the preparation of parenchymal cell cellulose ("PCC"). Parenchymatous tissues possess unique morphologies and the cellulose structure contained within such cells is a tertiary structure resulting from intermeshed and relatively disordered layers of microfibrils of cellulose. Acidic or basic hydrolysis, elevated reaction temperature, and physical shearing can be combined to disrupt the intercellular organization of the parenchymal cell cellulose and to induce defibrillation of the membrane. The dissolution of pectin and arabinogalactan from the insoluble parenchymal cell cellulose occurs without substantial degradation of these compounds. This solid/liquid mass is separated by washing. The separation provides a parenchymal cell cellulose network having the required ultrahigh surface area characteristics.

Bacterial fermentation of a sugar-containing solution can synthesize cellulose of high purity. Desirable bacteria for this purpose include the Acetobacter species. Subelementary fibrils are extruded from a row of pores in the bacterial cell. Each microfibril is composed of an average of three subelementary fibrils which are arrayed in a helix. Individual ribbons are composed of bundles of microfibrils that associate with one another by hydrogen bonding to form a tertiary structure. The width of this ribbon is significantly less than that of conventional cellulose fibers from plants. The pellicle/ribbon matrix of the Acetobacter exhibits substantial hydrophilicity due to its extensive interior surface area. The network of bacterial fibrils and microfibrils can be suitable for use with this invention in its native state. However, the total surface area of these fibrils and microfibrils can be significantly enhanced by high shear processing.

The dilute aqueous ultrahigh surface area cellulose slurries, that are produced by the processes above, generally contain less than 10 percent cellulose solids. Dehydration of the "activated" ultrahigh surface area cellulose slurries must be performed without hardening the cellulose solids so that the ultrahigh surface area cellulose can be redispersed without loss of its viscosity or other properties. The redispersion of the ultrahigh surface area cellulose into an edible non-aqueous hydrophilic liquid is identified as the "reactivation" of the ultrahigh surface area cellulose.

Chaotropic agents or "insulators", are useful during the dehydration procedure to prepare easily reactivated ultrahigh surface area cellulose. Desirable insulators include polyhydroxy compounds. Desirable polyhydroxy compounds include carbohydrates or carbohydrate-related compounds such as sugars, oligosaccharides, starches, carbohydrate gums, and cellulose gums. The selection of an insulator depends on a number of factors including its solubility, drying characteristics, application characteristics, and cost. Medium conversion ("42DE") corn syrups have been found to be particularly desirable insulators for use with the invention.

The use of conventional spray drying and other drying processes, such as fluid bed drying, can effectively dry a slurry of ultrahigh surface area cellulose. In general, as the ratio of the concentration of insulator to the concentration cellulose solids increases, the redispersion properties of the dried product are enhanced. Full reactivation of dehydrated ultrahigh surface area cellulose to approximately 100 percent of its original viscosity requires an insulator concentration of 100 percent to 200 percent based on the weight of the ultrahigh surface area cellulose. Therefore, the preferred dried ultrahigh surface area cellulose composition for this invention contains two-thirds medium conversion ("42DE") corn syrup and one-third ultrahigh surface area cellulose as calculated on a dry solids basis.

The edible non-aqueous hydrophilic liquid is another component of the edible composition of this invention. Edible non-aqueous hydrophilic liquids, for the purposes of this invention, contain less than 5 percent water. These liquids are considered to be "dry" liquids or essentially moisture-free liquids. Edible polyol humectants provide desirable non-aqueous hydrophilic liquids for the preparation of ultra-low water activity fillings according to this invention. A suitable edible polyol humectant is a member selected from the group consisting of glycerin, propylene glycol, 1,3-butylene glycol, and mixtures of these. Glycerin is the most preferred humectant for use with the invention because glycerin is commercially available in food grade or high purity concentrations and because glycerin has a low viscosity and a high boiling point.

The amount of edible polyol humectant used in the continuous liquid phase is primarily dependent on the final water activity that is desired for the filling. Generally, the edible polyol humectant is at least 50 percent of the continuous liquid phase of the filing and can be up to 100 percent of the continuous liquid phase. When the edible polyol humectant is high purity glycerin, the boiling point of the filling exceeds 450° F. (232° C.) and the water activity is about 0.15. High purity glycerin is at least 99.5 percent pure.

An edible solid phase is, desirably, incorporated into the continuous liquid phase. The edible solid phase is desirably a fine fondant quality powder. The edible solid phase is, desirably, a member selected from the group consisting of sugar, maltodextrin, polydextrose, salt, and mixtures of these. A sugar is, desirably, a member selected from the group consisting of sucrose, dextrose, fructose, corn syrup solids, sorbitol, and mixtures of these. The edible solid phase can include an insoluble solid. A desirable insoluble solid is a member selected from the group consisting of powdered alpha-cellulose, calcium sulfate, and mixtures of these. Desirable concentrations of edible solid phase ingredients are from about 5 percent to about 75 percent by weight of the final filling and are, preferably, used in quantities of between about 33 percent or "one-third" and above 67 percent or "two-thirds" by weight of the final filling.

Limited amounts of moisture can, optionally, be added to the a filling made with the edible composition of the invention when an elevated water activity is desired for the final product. When moisture is added to the composition, an aqueous solution is, desirably, added to the continuous liquid phase. Optionally, saturated syrups, such as fruit juice concentrates, can also be added. Stabilizers in the form of water soluble gums can further be incorporated into the composition to prevent or retard syneresis. The most thermostable of such fillings have an ultra-low water activity of below 0.6.

Flavoring materials, taste modifiers, colorants, and other "functional ingredients" can be added to the filling composition for the purpose of imparting desirable taste, appearance, and textural properties. Virtually any known flavoring material can be added to the filling. An example of a desirable flavoring material includes a member selected from the group consisting of cheese powder, cocoa powder, chocolate liquor, tomato powder, cinnamon, meat powder, dehydrated fruit pieces, dehydrated vegetable pieces, nuts, nut butter, cultured milk powder, and mixtures of these. Taste modifiers can be used in the filling composition to eliminate or reduce the sweetness intensity of glycerin or another polyol. An example of a taste modifier includes a member selected from the group consisting of sodium salt of paramethoxyphenoxypropionic acid (commercially available under trade name "Lactisole" from the Tate & Lyle), purified potassium salt of hop isohumulones (commercially trade name "Isolone" from Kalsec), and mixtures of these.

An objective of the invention is to provide a fat-free thermostable filling, but the filling composition can include small amounts of fat and emulsifiers to modify the texture and improve the handling characteristics of a filling without the filling losing its desirable characteristics. Desirable fats are partially or fully hydrogenated. Unsaturated oils that can be hydrogenated and used with the invention include an oil that is a member selected from the group consisting of coconut oil, corn oil, soybean oil, cotton seed oil, and mixtures of these. A suitable emulsifier includes a member selected from the group consisting of lecithin, a monoglyceride, a di-glyceride, sorbitan monostearate, and mixtures of these.

The melting point of a fat generally varies according to the degree of saturation or hydrogenation of the fat. A fat having a "Wiley melting point" of about 80° F. to 112° F. (26° C. to 45°) is preferred. Coconut fat, having a Wiley melting point of 92° F. (33° C.), is the most preferred fat. The addition of fats and/or emulsifiers to the filling composition provides the filling with a desirable "shortness" and reduces the "stringiness" of the filling during processing. The concentration of fat added to the filling composition is, desirably, about 0 percent to 15 percent, based on the final weight of the filling. A more desirable concentration of fat is less than 10 percent. The preferred concentration of fat is less than 5 percent.

Other ingredients can be included in the filling composition. An optional ingredient can be a member selected from the group consisting of natural colorant, synthetic colorant, an opacifier, vitamin, a mineral, a sequestrant, a buffer, an aeration agent, including a leavener such as sodium bicarbonate, a whipping aid, including egg white and soy albumin, and mixtures of these.

The invention includes a method for making the edible composition as well as methods for making a thermostable filling having ultra-low water activity from the edible composition. The method, optionally, includes mixing an edible non-aqueous hydrophilic liquid, which is desirably glycerin, with any saturated solution to adjust a water activity value for the edible non-aqueous hydrophilic liquid and the saturated solution to a desired value. The method further involves mixing any hydrophilic continuous liquid phase component with the edible non-aqueous hydrophilic liquid and, optionally, the saturated solution to form a slurry. The mixing procedures are preferably, performed in a jacketed scrape surface kettle. The method then requires adding a sufficient quantity of ultrahigh surface area cellulose into the slurry. Heating of the slurry is then performed at a temperature sufficient to reactivate the ultrahigh surface area cellulose in the edible non-aqueous hydrophilic liquid. Desirable temperatures are between about 120° F. and about 160° F. (about 49° C. and about 71° C.). The preferred temperature is 140° F. (60° C.). Shearing of the slurry then occurs, desirably, through an in-line high shear mixer or a homogenizer until the ultrahigh surface area cellulose is completely activated in the continuous phase. This procedure, typically, requires one to three sequential passes through the mixer or homogenizer. Essentially, full activation of the dry ultrahigh surface area cellulose must be achieved. Optionally, mixing into the slurry, under constant kettle agitation, of a solid phase powder or other ingredients can be performed. Alternative methods for making a thermostable filling containing a fat are performed by melting the fat and, then, mixing the fat into the slurry, desirably, with a portion of a solid powder phase. Aeration agents can, optionally, be pre-whipped into all or a portion of the original composition slurry of the hydrophilic continuous phase. The mixed, heated, and sheared slurry, then, undergoes cooling and packing at a temperature between about 140° F. and about 180° F. (about 60° C. and about 82° C.).

EXAMPLE 1

The following is an example of a thermostable filling made with the edible composition of the invention and a method for making the thermostable filling. The filling provided by this example is a thermostable, ultra-low water activity, fat-free, vanilla-flavored filling. The filling of this example is suitable for use with sandwich cookies such as those cookies sold under the trade name OREO.

TABLE 4

| INGREDIENT | WEIGHT |
| --- | --- |
| Glycerin[1] | 100 lbs |
| USAC Stabilizer, Dry[2] | 3 lbs |
| Sugar, Powdered[3] | 200 lbs |
| Vanillin | Variable |
| Total | 303 lbs |

[1]The glycerin is 99.5 percent pure, food grade glycerin.
[2]The USAC is in a ratio of 33 percent "dry solids basis" and is an ultrahigh surface area cellulose known as microfibrillated cellulose.
[3]The sugar is a 6X food grade sugar without starch.

The glycerin is mixed in a scrape surface, jacketed kettle with the dried USAC stabilizer to form a slurry. This slurry is heated to 140° F. (60° C.) and then passed three times through an in-line high shear mixer. A Megaton™ brand slotted rotor/stator line-pressure mechanical homogenizer manufactured by Kinematic is used for this example. The shearing procedure is continued until the USAC is fully reactivated. The slurry is a continuous liquid phase having an appearance and a texture comparable to a soft fat. The remaining ingredients are then added to the kettle and the entire mixture is blended into a uniform slurry. The slurry is then cooled to ambient temperature to form the thermostable filling. The cooled, thermostable filling has an $A_w$ of 0.15 and a boiling point in excess of 450° F. (232° C.).

EXAMPLE 2

The following is an example of a thermostable filling made with the edible composition of the invention and a method for making the thermostable filling. The filling provided by this example is a thermostable, ultra-low water activity, low-fat, cheese-flavored filling. The filling of this example is suitable for use with a savory-flavored, filled snack such as those sold under the trade name COMBO.

TABLE 5

| INGREDIENT | WEIGHT |
| --- | --- |
| Glycerin[1] | 100 lbs |
| USAC Stabilizer, Dry[2] | 3 lbs |
| Cheese Powder[3] | 100 lbs |
| Maltodextrin[4] | 88 lbs |
| Salt, Microfine | 12 lbs |
| Lactisole ™[5] | 300 ppm |
| Flavor | Variable |
| Total | 603 lbs |

[1]The glycerin is 99.5 percent pure, food grade glycerin.
[2]The USAC is in a ratio of 33 percent "dry solids basis" and is an ultrahigh surface area cellulose known as microfibrillated cellulose.
[3]The cheese powder is a commercially available high temperature cheddar powder.
[4]The maltodextrin is 10DE and 100 percent passes through a 200 U.S. mesh screen.
[5]The Lactisole ™ product is added as a 50 percent aqueous solution (41 grams Lactisole ™ product plus 41 grams water).

The glycerin, along with the Lactisole™ solution, is mixed in a scrape surface, jacketed kettle with the dried USAC stabilizer to form a slurry. This slurry is heated to 140° (160° C.) and then passed three times through an in-line high shear mixer. A Megaton™ brand slotted rotor/stator line-pressure mechanical homogenizer manufactured by Kinematic is used for this example. The shearing procedure is continued until the USAC is fully reactivated. The slurry is a continuous liquid phase having an appearance and a texture comparable to a soft fat. The remaining ingredients are then added with mixing into the kettle and the entire mix is blended into uniform slurry. The slurry is then cooled to ambient temperature to form the thermostable filling. The cooled, thermostable filling has an $A_w$ of 0.25 and a boiling point of approximately 450° F. (232° C.).

EXAMPLE 3

The following is an example of a thermostable filling made with the edible composition of the invention and a method for making the thermostable filling. The thermostable filling provided by this example is a thermostable, ultra-low water activity, low-fat, chocolate-flavored filling. The filling of this example is suitable for use with filled cookies such as those cookies sold under the trade name MAGIC MIDDLES.

TABLE 6

| INGREDIENT | WEIGHT |
| --- | --- |
| Glycerin[1] | 100 lbs |
| USAC Stabilizer, Dry[2] | 3 lbs |
| Sugar, Powdered[3] | 80 lbs |
| Chocolate Liquor | 20 lbs |
| Natural Flavors | Variable |
| Total | 203 lbs |

[1]The glycerin is 99.5 percent pure, food grade glycerin.
[2]The USAC is in a ratio of 33 percent "dry solids basis" and is an ultrahigh surface area cellulose known as microfibrillated cellulose.
[3]The sugar is a 6X food grade sugar without starch.

The glycerin is mixed in a scrape surface, jacketed kettle with the dried USAC stabilizer to form a slurry. This slurry is heated to 140° F. (60° C.) and then passed three times through an in-line high shear mixer. A Megaton™ brand slotted rotor/stator line-pressure mechanical homogenizer manufactured by Kinematic is used for this example. The shearing procedure is continued until the USAC is fully reactivated. The slurry is a continuous liquid phase having an appearance and a texture comparable to a soft fat. The chocolate liquor is melted and added to the kettle with mixing. The remaining ingredients are than added to the kettle and the entire mixture is blended to a uniform slurry. The slurry is then cooled to ambient temperature to form the thermostable filling. The cooled, thermostable filling has an $A_w$ of about 0.15 and a boiling point in excess of 450° F. (232° C.).

EXAMPLE 4

The following is an example of a thermostable filling made with the edible composition of the invention and a method for making the thermostable filling. The filling provided by this example is a thermostable, ultra-low water activity, fat-free, vanilla-flavored filling. The filling of this example is suitable for use with sandwich cookies such as those cookies sold under the trade name OREO.

TABLE 7

| INGREDIENT | WEIGHT |
| --- | --- |
| Propylene Glycol[1] | 100 lbs |
| USAC Stabilizer, Dry[2] | 3 lbs |
| Sugar, Powdered[3] | 200 lbs |
| Vanillin | Variable |
| Total | 303 lbs |

[1]The propylene glycol is 99.5 percent pure, food grade.
[2]The USAC is in a ratio of 33 percent "dry solids basis" and is an ultrahigh surface area cellulose known as parenchymal cell cellulose.
[3]The sugar is a 6X food grade sugar without starch.

The propylene glycol is mixed in a scrape surface, jacketed kettle with the dried USAC stabilizer to form a slurry. This slurry is heated to 160° F. (71° C.) and then passed three times through an in-line high shear mixer. A Megaton™ brand slotted rotor/stator line-pressure mechanical homogenizer manufactured by Kinematic is used for this example. The shearing procedure is continued until the USAC is fully reactivated. The slurry is a continuous liquid phase having an appearance and a texture comparable to a soft fat. The remaining ingredients are then added to the kettle and the entire mixture is blended into a uniform slurry. The slurry is then cooled to ambient temperature to form the thermostable filling. The cooled, thermostable filling has an $A_w$ of 0.15 and a boiling point in excess of 450° F. (232° C.).

EXAMPLE 5

The following is an example of the thermostable filling of the invention and the method for making the thermostable filling. The filling provided by this example is a thermostable, ultra-low water activity, fat-free, vanilla-flavored filling. The filling of this example is suitable for use with sandwich cookies such as those cookies sold under the trade name OREO.

TABLE 8

| INGREDIENT | WEIGHT |
| --- | --- |
| 1,3-Butylene Glycol[1] | 50 lbs |
| Glycerin[1] | 50 lbs |
| USAC Stabilizer, Dry[2] | 3 lbs |
| Sugar, Powdered[3] | 200 lbs |
| Vanillin | Variable |
| Total | 303 lbs |

[1]The 1,3-butylene glycol and the glycerin are 99.5 percent pure, food grade.
[2]The USAC is in a ratio of 33 percent "dry solids basis" and is an ultrahigh surface area cellulose known as microreticulated microcrystalline cellulose.
[3]The sugar is a 6X food grade sugar without starch.

The 1,3-butylene glycol and the glycerin are mixed in a scrape surface, jacketed kettle with the dried USAC stabilizer to form a slurry. This slurry is heated to 130° F. (54° C.) and then passed three times through an in-line high shear mixer. A Megaton™ brand slotted rotor/stator line-pressure mechanical homogenizer manufactured by Kinematic is used for this example. The shearing procedure is continued until the USAC is fully reactivated. The slurry is a continuous liquid phase having an appearance and a texture comparable to a soft fat. The remaining ingredients are then added to the kettle and the entire mixture is blended into a uniform slurry. The slurry is then cooled to ambient temperature to form the thermostable filling. The cooled, thermostable filling has an $A_w$ of 0.15 and a boiling point in excess of 450° F. (232° C.).

EXAMPLE 6

A co-extruded cookie composite is disclosed in this example that uses the thermostable filling of Example 3. The following standard sugar cookie formulation is the outer dough wrap.

TABLE 9

| INGREDIENT | CONCENTRATION |
| --- | --- |
| Cake Flour | 43.0% |
| Shortening | 25.0% |
| Granulated Sugar | 10.0% |
| Powdered Sugar | 10.0% |
| Whole Eggs | 5.2% |
| Butter | 5.0% |
| Nonfat Dry Milk | 1.4% |
| Vanilla | 0.4% |
| Total | 100.0% |

The softened butter, shortening, and sugar are mixed together in a Hobart mixer. The eggs are added in three stages with blending after each addition. The nonfat milk and vanilla are added with mixing. The cake flour is slowly added and blended on slow speed for 5 minutes.

The filling of Example 3 and the cookie dough are fed into opposite sides of a Rheon Model KN100 co-extruder and formed. These compositions are fed to the co-extruder in a ratio of approximately 40 percent of the filling to 60 percent of the dough. The prebake cookie size is set at approximately 25 to 30 grams. The co-extruder is regulated using an inner setting of 22 and an outer setting of 30 to provide it with an uniform fill. The cookies are extruded in the shape of small balls and are flattened to provide a normal sugar cookie appearance. The cookies are baked at 400° F. (204° C.) for approximately 8 minutes. The "after bake" weight is about 25 grams. The cookies bake without leakage.

This example demonstrates that fillings of this invention can be successfully used to prepare dual textured, cold formed masses and then baked. The filling portion of the mass remains thermostable during baking.

COMPARATIVE EXAMPLE A

A co-extruded cookie composite is disclosed in this comparative example that uses a thermostable filling that is prepared from the following formulation.

TABLE 10

| INGREDIENT | WEIGHT |
|---|---|
| Nulomoline ®[1] | 120 lbs |
| USAC Stabilizer Dry[2] | 3 lbs |
| Sugar, Powdered[3] | 60 lbs |
| Chocolate Liquor | 20 lbs |
| Natural Flavors | Variable |
| Total | 203 lbs |

[1]Nulomoline ® is a partial invert sugar syrup manufactured by Crompton & Knowles Corporation.
[2]The USAC is in a ratio of 33 percent "dry solids basis" and is an ultrahigh surface area cellulose known as microfibullated cellulose.
[3]The sugar is a 6X food grade sugar without starch.

The blending instructions to prepare the filling are the same as those described in Example 3 with the exception that Nulomoline® product is substituted for the glycerin. The filling has an $A_w$ of 0.60 to 0.65. The standard sugar cookie wrap described in Example 6 is also prepared for this comparative example.

The filling and cookie dough are fed into Opposite sides of a Rheon Model KN100 co-extruder and formed in the same procedure as described in Example 6, but using a higher water activity filling. The resulting cookie is approximately 40 percent filling and 60 percent dough and is formed by using an inner setting of 22 and an outer setting of 30 with an approximate prebake weight of 25 to 30 grams. The shape of the mass is that of small balls and the cookies are flattened to provide a normal sugar cookie appearance. The cookies are baked at 400° F. (204° C.) for approximately 8 minutes. The surface of the cookies crack open during baking and the filling leaks through the top of the cookies.

This comparative example demonstrates that fillings having water activities higher than 0.60 are not suitable in the preparation of dual textured, cold formed, baked goods.

EXAMPLE 8

A co-extruded cookie composite is disclosed in this example that uses the thermostable filling of Example 3 and the following low fat sugar cookie formulation as the outer dough wrap.

TABLE 11

| INGREDIENT | CONCENTRATION |
|---|---|
| Cake Flour | 44.00% |
| Water | 10.00% |
| Granulated Sugar | 9.00% |
| Powdered Sugar | 8.954 |
| Dur Lo Emulisifer ™[1] | 5.20% |
| Whole Eggs | 5.20% |
| Nulomoline ®[2] | 5.00% |
| Butter | 5.00% |
| Shortening | 5.00% |
| Nonfat Dry Milk | 1.40% |
| Kelit ™ CME[3] | 0.80% |
| Vanilla | 0.04% |
| Egg Shade DT901546[4] | 0.04% |
| Butter Flavor C10,860[5] | 0.01% |
| Total | 100.00% |

[1]Dur Lo Emulisifier ™ is manufactured by Van Den Bergh Foods.
[2]Nulomoline ® is a partial invert sugar syrup manufactured by Crompton & Knowles Corporation.
[3]Kelite ™ CME is xanthan gum manufactured by Kelco.
[4]Egg Shade DT901546 is a color solution manufactured by Crompton & Knowles Corporation.
[5]Butter Flavor C10,860 is an artificial butter flavor manufactured by Crompton & Knowles Corporation.

Kelite™ CME is blended into the dry sugars. The butter, shortening, Dur Lo Emulisifer™, and Nulomoline® are mixed with the sugar mixture in a Hobart mixer. The eggs are added in three stages with blending after each addition. Water is added in three stages with blending and mixed on medium speed for 5 minutes. The nonfat dry milk, Egg Shade, Butter Flavor, and vanilla are added with mixing. The cake flour is slowly added with mixing at slow speed for 5 minutes.

The cookie filling of Example 3 and the dough are fed into opposite sides of the Rheon Model KN100 co-extruder at a ratio of approximately 25 percent of filling and 75 percent of dough. The co-extruder is operated at an inner setting of 15 and an outer setting of 45. The prebake weight of the cookies is approximately 35 grams. The cookies are in the shape of small balls and are flattened to provide a normal sugar cookie appearance. The cookies are baked at 400° F. (204° C.) for approximately 8 minutes. The product bakes without any leakage.

This example demonstrates that the fillings of this invention can be successfully used along with low-fat dough to prepare dual textured, cold formed, bake goods.

I claim:
1. A thermostable edible composition comprising:
a non-aqueous hydrophilic liquid and
an ultrahigh surface area cellulose in sufficient quantity to heat stabilize said composition up to 450° F. wherein said ultrahigh surface area cellulose is a member selected from the group consisting of fibril cellulose, microfibril cellulose, and combinations thereof dried with at least one chaotropic agent and sheared with said non-aqueous hydrophilic liquid, such that said thermostable edible composition has a total lipid content of less than 15 percent.
2. The thermostable composition of claim 1, wherein said composition has an ultra-low water activity of below 0.6.
3. The thermostable composition of claim 2, wherein said composition has an ultra-low water activity of below 0.5.
4. The thermostable composition of claim 3, wherein said composition has an ultra-low water activity of between 0.15 and 0.45.

5. The thermostable composition of claim 1, wherein said sufficient quantity of said ultrahigh surface area cellulose provides a surface area of a fibril and microfibril network of at least 100 $m^2/gm$.

6. The thermostable composition of claim 1, wherein said non-aqueous hydrophilic liquid is an edible polyol humectant.

7. The thermostable composition of claim 6, wherein said edible polyol humectant is a member selected from the group consisting of glycerin, propylene glycol, 1,3-butylene glycol, and mixtures of these.

8. The thermostable composition of claim 7, wherein said edible polyol humectant is substantially non-aqueous.

9. The thermostable composition of claim 8, wherein said edible polyol humectant is at least 99.5 percent by weight pure.

10. The thermostable composition of claim 1, wherein said sufficient quantity of ultrahigh surface area cellulose is a concentration by weight in said composition from about 0.20 percent to about 4.0 percent.

11. The thermostable composition of claim 1, further comprising an edible solid phase.

12. The thermostable composition of claim 11, wherein said edible solid phase is from about 5 percent to about 75 percent by weight of said composition.

* * * * *